Nov. 3, 1931.  L. BELUGOU  1,830,419
ALTIMETER
Filed July 8, 1930   2 Sheets-Sheet 1

L. Belugou
INVENTOR

By: Marks & Clerk
Attys.

Patented Nov. 3, 1931

1,830,419

UNITED STATES PATENT OFFICE

LÉON BÉLUGOU, OF BELLEVUE, FRANCE

ALTIMETER

Application filed July 8, 1930. Serial No. 466,516.

My invention has for its object an improved altimeter of the type allowing the height of an object or its horizontal range to be ascertained through a mere reading, the usual deflecting means of the telemeter-altimeter disposed between the eye-piece and the object glasses providing a deflection proportional to the sine or cosine, according to the case, of the angle of sight of the plane containing the object and the axis of the telemeter.

Now according to my invention the deflecting means are disposed between the eye-piece and only one of the object glasses and comprise two optic systems providing equal and opposed deflections in the focal plane of the object glass. These systems are provided with any desired device for restoring the coincidence between the images produced by the two object glasses and furthermore with means for giving each system equal and opposite rotary motions round the optic axis, which motions are proportional to the angle of sight.

I have shown by way of example on appended drawings a form of execution of my invention.

Figure 1:
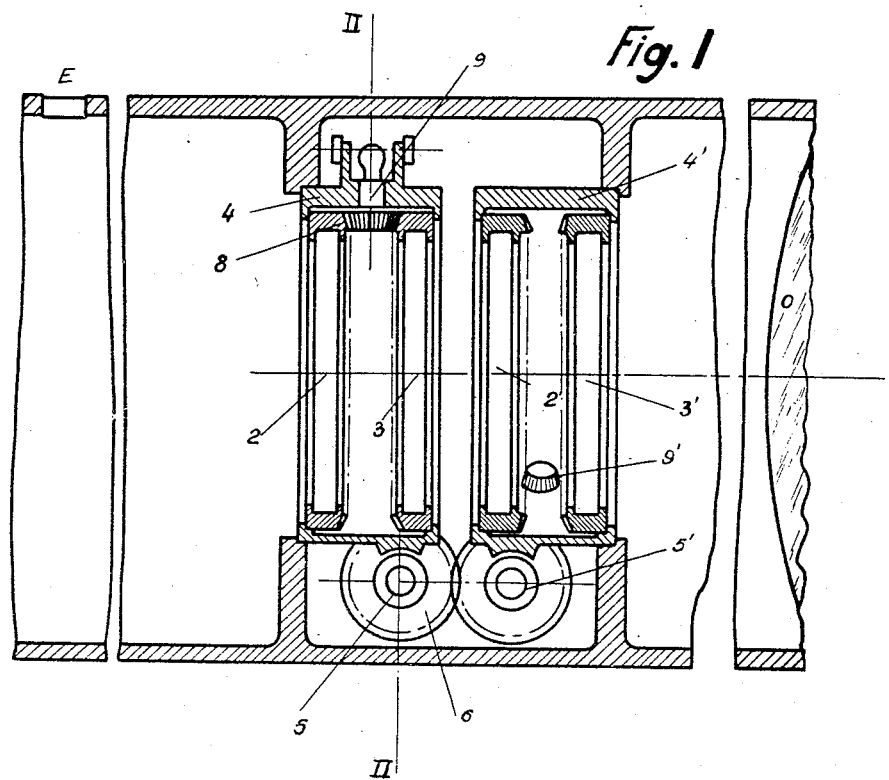
Figure 3:
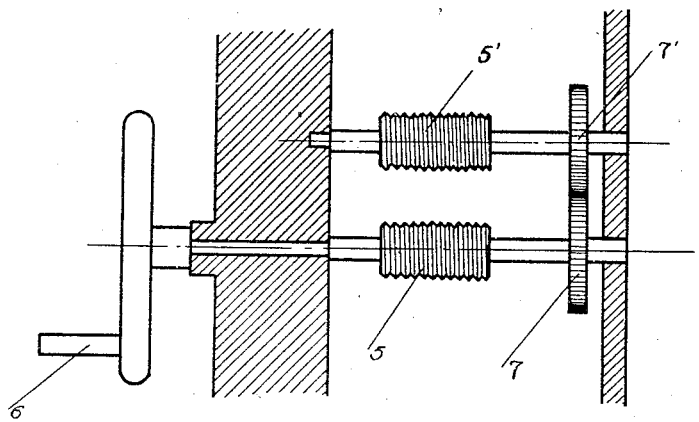
Figure 2:
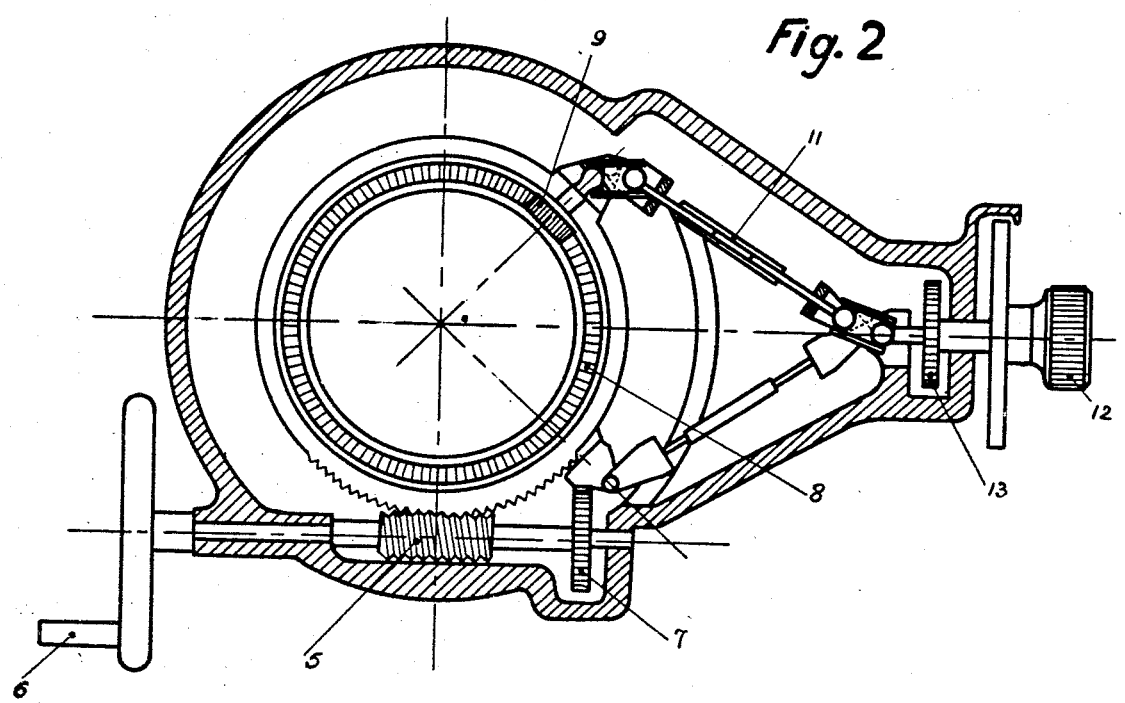
Figure 4:
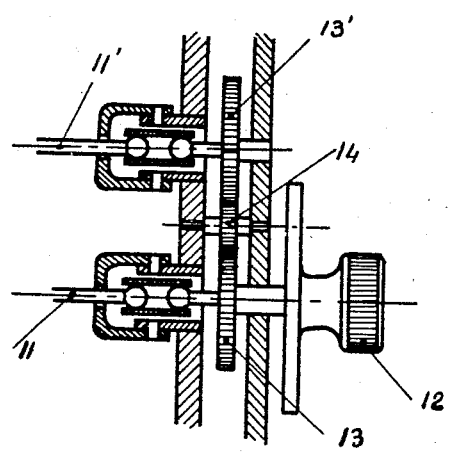

Figure 1 is a longitudinal section thereof and Figure 2 a cross-section through line II—II of Figure 1. Figures 3 and 4 show details.

As apparent from the drawings the optic deflecting arrangement comprises four prisms forming two systems 2—3 and 2'—3' disposed between the eye-piece E and one object glass O, the other object glass not being shown.

The prism systems are each mounted in a sleeve such as 4—4' provided with a toothwork meshing with a worm such as 5—5'. The rotation of worm 5 is controlled by the handwheel 6 moving proportionally to the angle of sight, said handwheel controlling through a suitable gear the angular position of the object glass carrying tube. The shaft of worm 5 carries a pinion 7 meshing with an equal pinion 7' on the shaft of which is keyed worm 5' meshing with the sleeve 4' of the system 2'—3'.

In each system such as 2—3, each prism is integral with a sunwheel such as 8 of a differential gear comprising a planet wheel such as 9 controlled in its turn through a sliding rod arrangement 11 of variable length actuated by the knob 12 giving out the angle of rotation of the prisms. The knob, rod and planet wheel are connected through a Hooke's or the like homokinetical joint whereby, whatever the angular position of the rod 11, said rod rotates at the same speed as the knob on one hand and planet wheel on the other.

The knob 12 transmits the movement simultaneously to the rod 11' and the planet pinion 9' of the system 2'—3' through the pinions 13—13' and the small intermediary pinion 14. A suitable control of the knob 12 provides therefore simultaneous restoration of coincidence for both prism systems.

The theory of this apparatus is as follows:

Supposing that, $d$ being the angle of deflection of a prism, the prism 2 is caused to rotate through an angle $e$ by actuation of the knob 12 and the prism 3 consequently through an angle $-e$ in the opposite direction round the optic axis, the deflection provided by the system 2—3 will be $2d \sin e$. The deflection provided by the system 2'—3' will also be $2d \sin e$ in the focal plane of the object glass. The total deflection will therefore be $4d \sin e$.

Now if the system 2—3 is bodily rotated in its sleeve through the angle S and consequently the system 2'—3' through the angle $-$S, the total deflection in the focal plane of the object glass is: $4d \sin e \sin S$.

This total deflection is of course equal to the parallaxis $$\frac{B}{D},$$

B being the length of the telemeter and D the distance of the object aimed at.

Thus $$\frac{B}{D} = 4d \sin e \sin S$$

and, as the height H of the object aimed at is $H = D \sin S$, $$\frac{B}{H} = 4 d \sin e.$$

The height or altitude depends thus on the angle *e* and it may be read directly on the telemeter knob 12.

What I claim is:—

1. In an altimeter the provision of two optic deflecting systems comprising each two prisms and a common toothed socket frictionally holding same, a worm wheel engaging each socket, common hand-actuated means for rotating the worms in opposite directions through angles proportional to the angle of sight, a sunwheel integral with each prism, a planet wheel cooperating with the two sunwheels of each system, a telescoping rod for each planet wheel, a common knob for the two rods and homokinetical joints connecting the knob with each rod and each rod with its planet wheel.

2. In an altimeter, the combination of an eye piece, an object-glass, two optic deflecting systems comprising each two elements, both systems being disposed to one side of the eye-piece between the eye-piece and the object-glass, means for giving simultaneously to each system bodily opposite rotary motions round the optic axis proportional to the angle of sight, means for making the two elements of each system rotate in opposite directions through equal angles and means independent of the first-mentioned means for controlling the last-mentioned means and making the elements of both systems rotate through the same angle.

In testimony whereof I affix my signature.

LÉON BÉLUGOU.